United States Patent
Glöckner et al.

(10) Patent No.: US 12,460,718 B2
(45) Date of Patent: Nov. 4, 2025

(54) TRACTION DRIVE SYSTEM AND METHOD FOR OPERATING A TRACTION DRIVE SYSTEM

(71) Applicant: ZF FRIEDRICHSHAFEN AG, Friedrichshafen (DE)

(72) Inventors: Rico Glöckner, Pocking (DE); Jan Döring, Passau (DE); Johannes Kugler, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 18/704,502

(22) PCT Filed: Nov. 3, 2022

(86) PCT No.: PCT/EP2022/080637
§ 371 (c)(1),
(2) Date: Apr. 25, 2024

(87) PCT Pub. No.: WO2023/078975
PCT Pub. Date: May 11, 2023

(65) Prior Publication Data
US 2024/0328507 A1    Oct. 3, 2024

(30) Foreign Application Priority Data
Nov. 4, 2021 (DE) .............. 10 2021 212 421.6

(51) Int. Cl.
*F16H 61/02* (2006.01)
*F16H 59/44* (2006.01)
(Continued)

(52) U.S. Cl.
CPC .......... *F16H 61/0213* (2013.01); *F16H 59/44* (2013.01); *F16H 59/48* (2013.01);
(Continued)

(58) Field of Classification Search
CPC ...... F16H 61/0213; F16H 59/44; F16H 59/48; F16H 59/50; F16H 59/66; F16H 59/78; F16H 61/16; F16H 2061/022
(Continued)

(56) References Cited

U.S. PATENT DOCUMENTS 5,903,061 A    5/1999  Tsuzuki et al.
8,214,093 B2 *  7/2012  Heap .................. B60K 6/365
                                                  701/84
(Continued)

FOREIGN PATENT DOCUMENTS

DE        19632855 A1   2/1997
DE     102015208160 A1  3/2016
(Continued)

*Primary Examiner* — Mohamed Abdo Algehaim
(74) *Attorney, Agent, or Firm* — LEYDIG, VOIT & MAYER, LTD.

(57) ABSTRACT

A traction drive system for a work machine, including at least one electric motor, a transmission, and a controller. The controller is configured to select a gear ratio of the transmission depending on a change to be expected in a motor output of the at least one electric motor. The change to be expected in the motor output is conditional on a change in the gear ratio of the transmission. The change to be expected in the motor output is determined on the basis of at least one operating parameter of the work machine.

10 Claims, 3 Drawing Sheets

(51) Int. Cl.
*F16H 59/48* (2006.01)
*F16H 59/50* (2006.01)
*F16H 59/66* (2006.01)
*F16H 59/78* (2006.01)
*F16H 61/16* (2006.01)

(52) U.S. Cl.
CPC ............ *F16H 59/50* (2013.01); *F16H 59/66* (2013.01); *F16H 59/78* (2013.01); *F16H 61/16* (2013.01); *F16H 2061/022* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 10,793,092 | B2* | 10/2020 | Omran | B60W 10/11 |
| 2012/0259498 | A1* | 10/2012 | Andri | F02D 19/0665 |
| | | | | 180/65.265 |
| 2013/0292992 | A1* | 11/2013 | Cahill | B64C 25/44 |
| | | | | 301/6.2 |
| 2015/0217766 | A1* | 8/2015 | Kelly | B60W 10/184 |
| | | | | 701/94 |
| 2015/0217771 | A1* | 8/2015 | Kelly | F16H 61/0213 |
| | | | | 701/93 |
| 2015/0329105 | A1* | 11/2015 | Matsui | B60K 6/547 |
| | | | | 180/65.265 |
| 2016/0047467 | A1* | 2/2016 | Andersson | F16H 59/78 |
| | | | | 701/54 |
| 2016/0090091 | A1 | 3/2016 | Gugel et al. | |
| 2017/0197624 | A1* | 7/2017 | Omran | B60K 17/02 |
| 2017/0232958 | A1* | 8/2017 | Hata | B60W 30/045 |
| | | | | 701/22 |
| 2018/0149264 | A1* | 5/2018 | Pilzweger | F16H 61/0213 |
| 2018/0354488 | A1* | 12/2018 | Omran | B60W 30/18072 |
| 2019/0202379 | A1* | 7/2019 | Omran | B60W 30/1882 |
| 2019/0211925 | A1* | 7/2019 | Beyer | F16H 47/04 |
| 2019/0351910 | A1* | 11/2019 | Kassen | B60W 10/12 |
| 2020/0103025 | A1* | 4/2020 | Omran | F16H 61/0213 |
| 2020/0324636 | A1 | 10/2020 | Gloeckner et al. | |
| 2022/0063624 | A1* | 3/2022 | Takenaka | B60W 10/101 |
| 2022/0145786 | A1* | 5/2022 | Ishizaki | B60K 6/445 |
| 2023/0039347 | A1* | 2/2023 | Isami | B60L 3/0061 |
| 2023/0331212 | A1* | 10/2023 | Owen | B60W 10/14 |

FOREIGN PATENT DOCUMENTS

| | | |
|---|---|---|
| DE | 102019203725 A1 * | 9/2020 |
| DE | 102019205231 A1 | 10/2020 |
| DE | 102019206075 A1 | 10/2020 |

* cited by examiner

TRACTION DRIVE SYSTEM AND METHOD FOR OPERATING A TRACTION DRIVE SYSTEM

CROSS REFERENCE TO RELATED APPLICATIONS

This application is a U.S. National Phase application under 35 U.S.C. § 371 of International Application No. PCT/EP2022/080637, filed on Nov. 3, 2022, and claims benefit to German Patent Application No. DE 10 2021 212 421.6, filed on Nov. 4, 2021. The International Application was published in German on May 11, 2023, as WO 2023/078975 A1 under PCT Article 21 (2).

FIELD

The present invention relates to a traction system for a work machine. The invention additionally relates to a work machine with such a traction drive system. The invention moreover relates to a method for operating a traction drive system for a work machine and to a control apparatus for performing such a method.

BACKGROUND

Electrically driven work machines are known. Their drive trains can have an electric motor and a transmission mechanically actively connected to the latter with at least two switching stages. A corresponding switching stage can be chosen on the basis of a driving requirement and a map of the electric motor. Large overlaps of the switching stages in terms of speed and tractive force of the work machine are possible here.

SUMMARY

In an embodiment, the present disclosure provides a traction drive system for a work machine, comprising at least one electric motor, a transmission, and a controller. The controller is configured to select a gear ratio of the transmission depending on a change to be expected in a motor output of the at least one electric motor. The change to be expected in the motor output is conditional on a change in the gear ratio of the transmission. The change to be expected in the motor output is determined on the basis of at least one operating parameter of the work machine.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In a first aspect, the present invention provides a traction drive system for a work machine. The traction drive system can be designed as an electric traction drive system for an electrically operable work machine. The traction drive system is designed to move the work machine. The traction drive of the work machine can drive a chassis by means of which the work machine can be moved. The work machine can be an autonomous work machine. The work machine can therefore be a mobile work machine. The work machine can be designed as a battery-powered work machine or a so-called BEV work machine. The work machine can be designed as a vehicle which is designed to perform at least one work task which is not specified for the transporting of people and/or goods. For this purpose, the work machine can have a work device or a work tool. In order to drive the work device, the work machine can have a work drive. The work machine can be a construction work machine and/or an agricultural work machine. For example, the work machine is a wheel loader, a tractor, a concrete mixer, a disposal vehicle, or a refrigerated vehicle. The work machine can be an automatedly operable work machine which can be remote-controlled. The automatedly operable work machine can be designed as an autonomous work machine.

The traction drive system has at least one electric motor and a transmission device. A traction drive of the work machine can be driven via the transmission device and the at least one electric motor. Moreover, a work drive of the work machine can be driven by the at least one electric motor via a clutch. The at least one electric motor can be supplied with energy from an energy source. The energy source can be a battery and/or a fuel cell which can be arranged on the work machine. The electric motor can be designed as an asynchronous machine, a synchronous machine, and/or a reluctance machine. In other words, the at least one electric motor can have any known electric motor design to drive a traction drive of a work machine.

The traction drive system additionally has a control device which is configured to select a gear ratio of the transmission device depending on the change to be expected in the motor output of the at least one electric motor. The change to be expected in the motor output is here conditional on the change in the gear ratio of the transmission device and is determined on the basis of at least one operating parameter of the work machine. Configuration of a control device for performing a step is understood to be the specific preparation, for example programming, of the control device for performing the step. The at least one operating parameter can thus constitute an input variable for the control device which can be read by the latter via at least one interface. The control device can then determine therefrom the change to be expected in the motor output of the electric motor. The control device can moreover have an interface for the output of a control command to the transmission device. The control command can include a selected gear ratio which can be supplied by the transmission device. The control device can moreover be configured as a transmission control system for setting the gear ratio of the transmission device. The control device can function as a driving strategy control system or as a driving strategy regulator.

The transmission device can have at least one gear ratio. According to this gear ratio, the transmission device can convert a motor speed of the electric motor into a drive speed for driving the work machine. Alternatively or additionally, the transmission device can also convert a motor speed of the electric motor into a work speed for a work device of the work machine. For this purpose, the transmission device can be actively mechanically connected both to the electric motor, on the one hand, and to a drive device for driving the work machine or to the work device of the work machine, on the other hand. This conversion can be effected by means of meshing gear wheels. Depending on the type of work machine, the transmission device can also have a plurality of gear ratios. In this case, for example, a first gear ratio for a driving state of the work machine and a second gear ratio for a work state of the work machine can be provided. It is then possible during operation of the work machine to switch between these gear ratios, for example by actuation of an operating element by the driver of the work machine. The change in the gear ratio of the transmission device can be a switching procedure between two different switching stages of the work machine.

As described above, different gear ratios of the transmission device can be provided for the respective operating states of the work machine such as, for example, a driving state and a work state. The output made available by the electric motor can be transmitted, in a suitable manner for the respective operating state of the work machine, to the drive device or the work device of the work machine. For example, in a driving state of the work machine, a majority of the motor output of the electric motor can be transmitted as uniformly as possible by means of a first gear ratio to the drive device of the work machine in order to enable fast and smooth driving of the work machine. The remainder of the motor output can then be transmitted by means of this first gear ratio to the work device in such a way that the latter can only be maintained in a desired state. In this exemplary embodiment, movement of the work device in the first gear ratio is not possible. In a further example, in a work state of the work machine, the motor output of the electric motor is transmitted by means of a second gear ratio of the transmission device to the work device in such a way that working of the work machine which is appropriate for the task, for example is precise or fast, can be enabled. In this exemplary embodiment, the drive device of the work machine is supplied with a small amount of motor output in the second gear ratio. In other words, a change in the gear ratio of the transmission device can cause a change in the motor output of the electric motor.

Depending on the respective operating state of the work machine, the control device can determine, on the basis of at least one operating parameter of the work machine, the change in the motor output of the electric motor which is conditional on a change in the motor output of the electric motor. The control device can determine the change in the motor output, for example in terms of its absolute value, its relative value, its total duration, or its progression over time, in particular its amplitude. For this purpose, the at least one operating parameter can be detected directly and the change to be expected in the motor output of the electric motor determined therefrom. The change in the motor output can be determined, for example, with the aid of a simulation performed by the control device. Alternatively, the value of the detected operating parameter of the work machine can be further processed by the control device in an intermediate step and the change to be expected in the motor output determined only in a subsequent step. For example, the control device can first calculate its change over time from a plurality of detected absolute values and then determine the change to be expected in the motor output of the electric motor from this change over time.

The disclosed traction drive system enables movement with an electrified work machine in a performance-optimized fashion. To be more precise, with the disclosed traction drive system a change in the gear ratio of the transmission device can be implemented in such a way that an interruption in the motor output of the electric motor, caused by a change in the gear ratio, is avoided as far as possible. An interruption in the motor output of the electric motor, caused by a change in the gear ratio, can be an interruption in the tractive force. According to an embodiment of the present invention, the tractive force of the electric motor is maintained at as constant a level as possible at the expense of a higher thermal load on the traction drive system. The disadvantages caused by an interruption in the tractive force, such as for example unstable driving behavior or an insufficient supply of power to the work device for carrying out the necessary work can thus be avoided.

According to an embodiment of the traction drive system, the at least one operating parameter is selected from one of the following: a) a speed of the work machine, b) a change in the speed of the work machine, and c) a change in the electrical energy which is output from an electrical energy source for supplying the at least one electric motor with energy. An imminent change in the motor output of the electric motor, in particular an interruption in the tractive force, can be calculated very reliably from these parameters. For example, in the case of a relatively high speed of the work machine, it can be assumed that a change in the gear ratio of the transmission device causes a relatively high interruption in the tractive force. The current gear ratio of the transmission device should accordingly be maintained in such a case. Similarly, in the case of a relatively low speed of the work machine, it can be assumed that a change in the gear ratio of the transmission device causes only a relatively small interruption in the tractive force. A switching procedure can accordingly be performed here. Furthermore, a change in the current speed of the work machine can, for example, be an indicator that the latter is returning to a work location from a relatively long journey. This can be the case, for example, in the case of a decreasing speed. Alternatively, in the case of an increasing speed, it can be assumed that the work machine is setting off, loaded, from a work location on a relatively long transport journey. In the first case, only a small interruption in the tractive force caused by a switching procedure can again be expected, whereas in the second case a switching procedure can cause a relatively large change in the tractive force. Lastly, an increase in the amount of energy output by the energy source can indicate, for example, that a work procedure has begun. In such a case, a change in the gear ratio of the transmission device can cause an undesirably large interruption in the tractive force. A switching procedure can then be avoided by the traction drive system according to embodiments of the invention. Alternatively, a decrease in the amount of energy output by the energy source can, for example, indicate that a work procedure has ended and a transport journey has begun. In this case, a change in the gear ratio of the transmission device can cause only a small interruption in the tractive force. A switching procedure can then take place. Lastly, the selected operating parameters can be measured easily and cost-effectively. The selection of the described operating parameters thus enables a reliable and at the same time simple and cost-effective determination of a change in the motor output of the electric motor to be expected.

According to a further embodiment of the traction drive system, the control device is configured to select at least two different gear ratios of the transmission device. The control device can choose, for example, between a gear ratio which is suitable for a relatively long journey and a gear ratio which is suitable for a work procedure of the work machine. An interruption in the tractive force can accordingly be avoided for each selectable gear ratio. The driving experience and the operating comfort for a driver of the work machine can be improved as a result.

In this embodiment of the traction drive system, the control device is configured to select a second gear ratio which is different from a first gear ratio of the transmission device when the change to be expected in the motor output is below a predetermined threshold value. The threshold value can be determined, for example, by a desired speed of the electric motor, a desired speed of the drive device, or a desired speed of the work device. Alternatively, the threshold value can be determined by a minimum or maximum speed of the abovementioned components. The threshold value can differ depending on the selected gear ratio of the transmission device. Alternatively, an identical, in particular maximum, threshold value can also be determined for all selectable gear ratios. The threshold value can be determined depending on the at least one operating parameter. The threshold value can also be determined independently of the at least one operating parameter. For example, the threshold value can be determined by means of a user input. The threshold value can be adapted according to the operating duration or operating state of the work machine. Selecting the gear ratio of the transmission device by means of a threshold value affords the possibility of readily understandable recording and monitoring of the selection procedure of the control device. In other words, it is easily understandable on the basis of the value exceeding or falling below the threshold value whether a switching procedure has taken place or not. Furthermore, by manually adapting the threshold value, the selection of the gears can be actively adapted by the control device, for example, to the needs of the driver or an operating situation.

According to a further embodiment of the traction drive system, the control device is configured to select the gear ratio of the transmission device taking into account a total output of the traction drive system. In addition to selecting the gear ratio of the transmission device, the total output of the traction drive system can then serve as a further selection criterion for a suitable switching stage in terms of minimizing the interruption in the tractive force. The switching behavior of the work machine can advantageously consequently also be controlled in terms of optimizing the total output of the traction drive system.

The total output of the traction drive system can be determined on the basis of at least one of the following operating parameters of the work machine: a) a change in output during the change of the gear ratio; b) a change in output because of different degrees of efficiency of the gear ratios of the transmission device; c) a change in output because of incomplete transmission of force inside the traction drive system; and d) an output characteristic of the traction drive system which is saved in a memory device of the work machine. A change in output during the change in the gear ratio can occur, for example, as a result of the occurrence of a mechanical or thermal load when the gear wheels of the transmission device mesh with one another. Depending on the speed of the electric motor, the output generated by the electric motor can be transmitted differently to the drive or work device when the gear ratio of the transmission device changes. As a result, changes in output within the total output of the traction drive system can also occur. Furthermore, the switching can take place by means of a manual force transmission element, in particular a clutch. The total output of the traction drive system can also be adversely affected by incorrect or too quick actuation of the clutch. Lastly, output characteristics of the traction drive system can have been saved in a memory device of the work machine, for example because of earlier recordings of the driving behavior of the work machine. These can represent, for example, desired driving behavior or undesired driving behavior of the work machine. The total output of the traction drive system can also be determined on the basis of these output characteristics. The abovedescribed parameters are easily measurable or quantifiable and form at the same time the total output of the traction drive system precisely. The selection of the described parameters thus enables reliable and at the same time simple determination of the total output of the traction drive system.

According to a further embodiment of the traction drive system, the control device is configured to select the gear ratio of the transmission device moreover taking into account a temperature state in the traction drive system. For example, the temperature of a winding of the electric motor can be monitored and an estimate made from the change therein of a duration for which the electric motor can maintain the current operating state. Alternatively or additionally, the temperature of a clutch of the work machine can be measured and an estimate made therefrom of an estimated operating time. Accordingly, in addition to the estimated interruption in the tractive force, a change in the gear ratio of the transmission device can also be selected on the basis of a temperature of at least one of the components of the traction drive system. As a result, a switching procedure can advantageously also be performed or avoided in terms of a thermal load within the traction drive system.

According to a further embodiment, the traction drive system comprises a sensor for detecting a terrain structure surrounding the work machine. According to this embodiment, the control device is configured to select the gear ratio of the transmission device taking into account the terrain structure. For example, a slope or an uneven surface in front of the work machine in the driving direction can be identified by the sensor. In this case, the selection of a different gear ratio can cause an interruption in the tractive force which can be avoided thanks to the disclosed traction drive system. Conversely, when a flat and straight road is detected by the sensor, a switching procedure can only cause a small change in the motor output. The control device here can then select a different gear ratio of the transmission device. The advantage of an additional selection of the gear ratio of the transmission device on the basis of a detected terrain structure consists in the possibility that the change in the motor output of the electric motor is also adapted on the basis of a terrain to be traveled over. The switching behavior of the traction drive system can accordingly be further refined.

According to a further embodiment of the traction drive system, the control device is configured to select the gear ratio of the transmission device taking into account an operating state of a work device actively connected to a work drive. The operating state can include an operating state of a work hydraulic system or a work tool of the work device. The operating state can include a position, a movement, or a filling level of the work tool. The work tool can be, for example, a lifting platform or a bucket. The transmission device can thus be activated taking into account a current work situation in such a way that the at least one electric motor can be operated at an optimized operating point during the current work situation too. If the work machine is a wheel loader, the operating state of the lifting platform or the bucket can be taken into account, for example during a rise/run of the wheel loader when the wheel loader is moving off and at the same time raising the bucket.

An aspect of the present invention provides a work machine with a traction drive system according to one of the abovedescribed embodiments. The traction drive system is configured to drive the work machine by means of the traction drive.

An aspect of the present invention provides a method for operating a traction drive system for a work machine which has at least one electric motor and a transmission device. In one step of the method, a change to be expected in the motor output of the at least one electric motor is determined on the basis of at least one operating parameter of the work machine. The change to be expected in the motor output is conditional on the change in a gear ratio of the transmission device. In a further step of the method, a gear ratio of the transmission device is selected depending on the change to be expected in the motor output.

An aspect of the present invention provides a control device which can be connected to a traction drive system according to the first aspect by means of at least one interface and is configured to perform the steps of the method according to the second aspect. The control device can be the control device described with respect to the first aspect. Reference is made to the above explanations in terms of understanding the individual features and their advantages.

Figure 1:
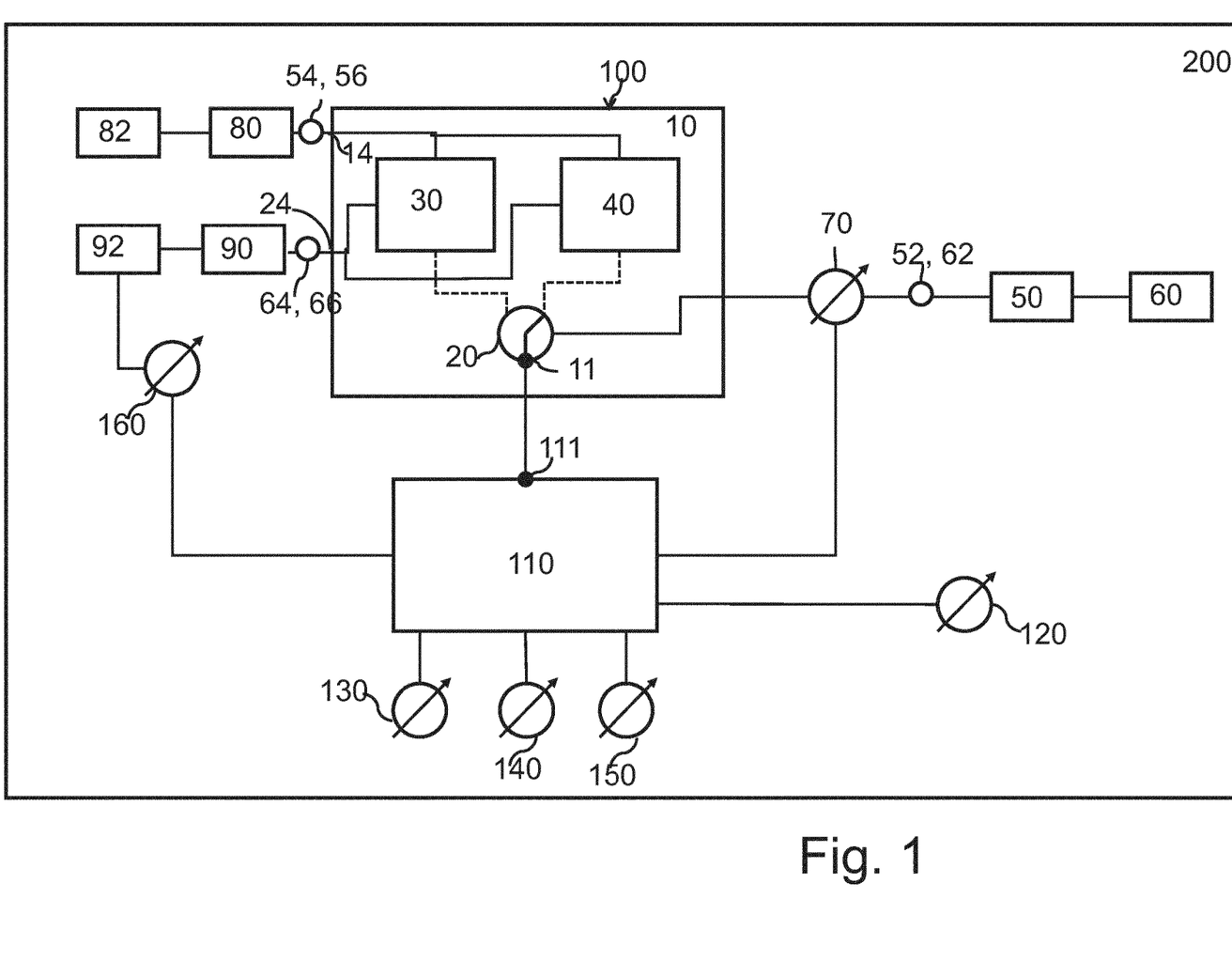
FIG. 1 illustrates schematically a traction drive system with further components of a work machine according to an embodiment of the invention.

FIG. 1 shows schematically a traction drive system 100 of a work machine 200 which is only indicated. The traction drive system 100 shown in FIG. 1 has an electric motor 50 and an energy source 60. The energy source 60 supplies the electric motor 50 with energy and for this purpose is electrically connected to the electric motor 50.

The traction drive system 100 additionally has a transmission device 10. The transmission device 10 has two gear stages which each represent a gear ratio 30, 40. The gear stages 30, 40 are each mechanically connected to the electric motor 50 via a switch element 20 of the transmission 10. The gear stages 30, 40 are moreover mechanically connected to a traction drive 80 of the work machine 200 via a first transmission output 14. The traction drive 80 is mechanically actively connected to a chassis 82 for the purpose of driving the latter. The gear stages 30, 40 of the transmission device 10 of the traction drive system 100 are additionally mechanically connected to a work drive 90 of the work machine 200 via a second transmission output 24. The work drive 90 is connected to a work device 92 for the purpose of driving the latter. In some embodiments, the work device 92 has a drum, which can be driven in rotation, of a concrete mixer, a hydraulically actuatable compactor of a disposal vehicle, or a hydraulically movable bucket of a wheel loader.

The transmission device 10 of the traction drive system 100 is designed to convert a first motor speed 52 of the electric motor 50, by selecting one of the two gear ratios 30, 40, into a first drive speed 54 of the traction drive 80 or a first drive speed 64 of the work drive 90. The transmission device 10 is additionally designed to convert a second motor speed 62 of the electric motor 50, by selecting one of the two gear ratios 30, 40, into a second drive speed 56 of the traction drive 80 or a second drive speed 66 of the work drive 90. The drive speeds 54 and 56 of the traction drive system 80, and the drive speeds 64, 66 of the work drive 90, are each illustrated in FIG. 1 by a common element. However, this illustration serves only for the purpose of clarity and is in no way to be understood as implying a restriction. In particular, the first and the second drive speeds 54, 56 and 64, 66 can each be significantly different from each other.

The traction drive system 100 additionally has a control device 110 for activating the transmission device 10. The control device 110 is for this purpose communicatively connected to the transmission device 10 via a respective control interface 11, 111 of the transmission device 10 and the control device 110. The control device 110 activates the transmission device 10 by means of the switch element 20 in order to set a respective gear ratio 30, 40 of the transmission device 10. The selection of a gear ratio 30, 40 of the transmission device 10 by the control device 110 will be described in more detail below.

In the exemplary embodiment in FIG. 1, the gear ratio 30 of the transmission device 10 is selected. This is illustrated by an activation of the gear stage, representative for the gear ratio 30, by the control device 110 via the switch element 20. In contrast, the gear stage representative for the gear ratio 40 is not activated by the control device 110 via the switch element 20. First, the control device 110 detects an operating parameter of the work machine 200 by means of a sensor 120. Furthermore, the control device 110 detects a motor output of the electric motor 50 by means of a sensor 70. The control device 110 calculates therefrom a change in the motor output of the electric motor 50 which is conditional on a change of the gear ratio 30 to a gear ratio 40. If this change in the motor output is below a predetermined threshold value, the control device 110 then activates the gear stage representative for the gear ratio 40 via the switch element 20. If, in contrast, the change in the motor output is above the threshold value, the control device 110 continues to activate the gear stage representative for the gear ratio 30 via the switch element 20. Depending on an output of the electric motor 50 and the operating parameter detected via the sensor 120, the control device 110 can accordingly make a selection from the gear ratios 30, 40 which are suitable in each case.

According to embodiments of the invention, the control device 110 can include further parameters in the selection of the gear ratio 30, 40 of the transmission device 10. For example, the control device 110 can take into account a temperature of the traction drive system 100 via the sensor 130. Alternatively or additionally, a total output of the traction drive system 100 can be detected via the sensor 140 and taken into account in the selection of the gear ratios 30, 40 by the control device 110. Analogously, a terrain structure surrounding the work machine 200 via the sensor 150 or at least one operating state of the work device 92 via the sensor 160 can be detected by the control device 110 and be taken into account in the selection of the gear ratios 30, 40 by the control device 110.

Figure 2:
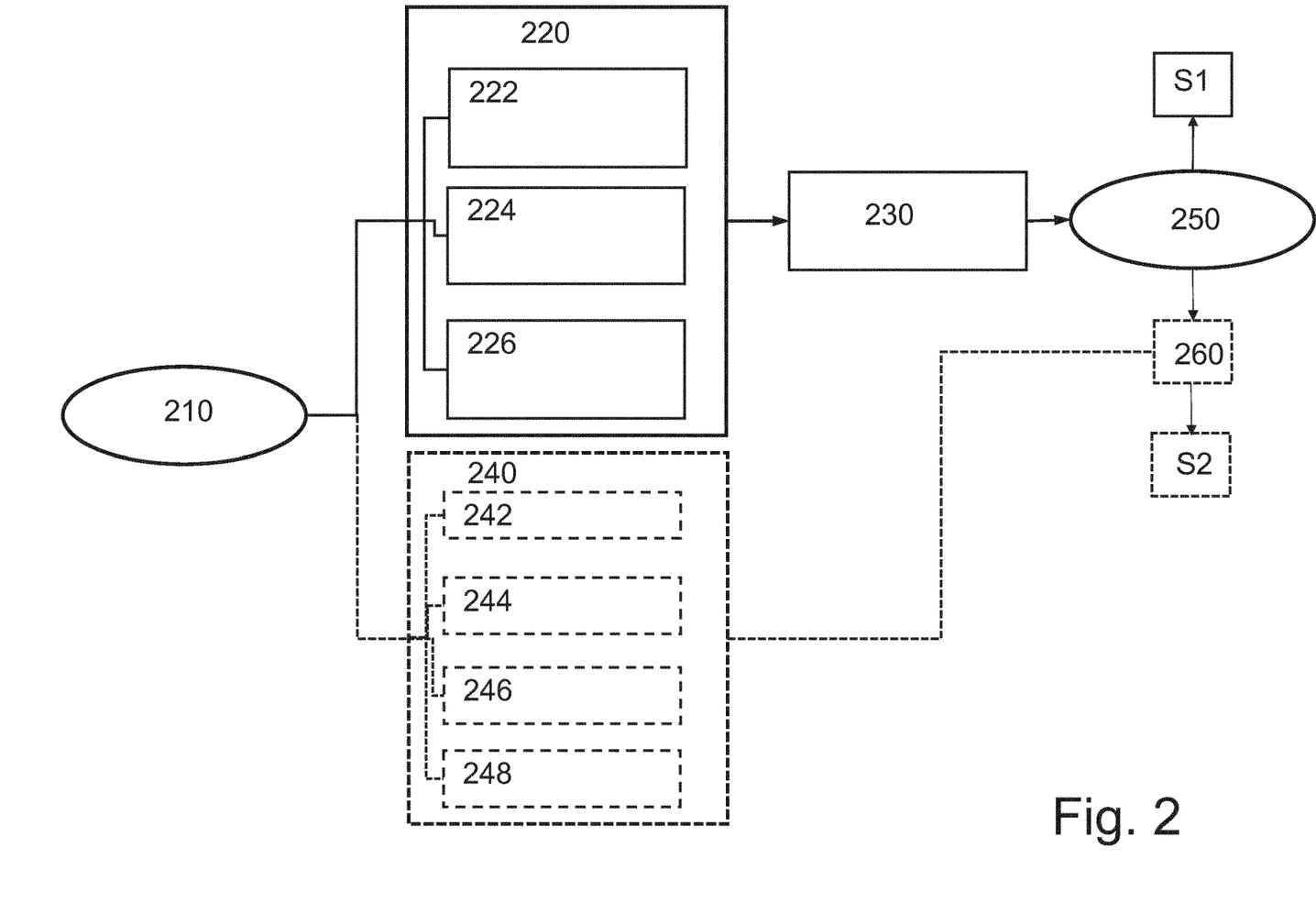
FIG. 2 illustrates schematically a process, performed by the control device according to an embodiment of the invention, for selecting a gear ratio of the transmission device.

FIG. 2 shows a selection process, performed by the control device 110, for selecting a gear ratio 30, 40 of the transmission device 10. The process begins at step 210 with the identification of an imminent change in a gear ratio 30, 40. This can here be, for example, the identification of a switching procedure. Subsequently, in step 220 at least one operating parameter of the work machine 200 is measured, for example via the sensor 120. To be more precise, at least one of the following parameters is measured by the sensor 120: a speed of the work machine in step 222, a change in the speed in step 224, or a change in the energy output from the energy source 60 in step 226. On the basis of the measured operating parameter, in step 230 the control device 110 determines a change to be expected in the motor output of the electric motor 50. In step 250, the change to be expected in the motor output is then compared by the control device 110 with a threshold value. As long as the change in the motor output is not below the threshold value, the control device 110 maintains the currently engaged switching stage (the switching stage S1 in FIG. 2). If, in contrast, the change in the motor output is below the threshold value, the control device 110 selects a different switching stage from the currently engaged switching stage (the switching stage S2 in FIG. 2).

In an optional step 240 (illustrated in FIG. 2 by a dashed border), at least one further parameter is measured inside or outside the work machine 200 (for example, via the sensors 130, 140, 150, or 160). To be more precise, in the optional step 242, a total output of the traction drive system 100 of the work machine 200 is measured. Alternatively or additionally, in the optional step 244, a temperature state of the traction drive system 100 is measured. Alternatively or additionally, in the optional step 236, a terrain structure outside the work machine 200 is measured. Alternatively or additionally, in the optional step 248, an operating state of the work device 92 of the work machine 200 is measured. These optionally measured parameters are taken into account by the control device 110 in an optional step 260 (illustrated in FIG. 2 by a dashed border) in addition to the change in the motor output of the electric motor 50 when the gear ratios 30, 40 are selected.

Figure 3:
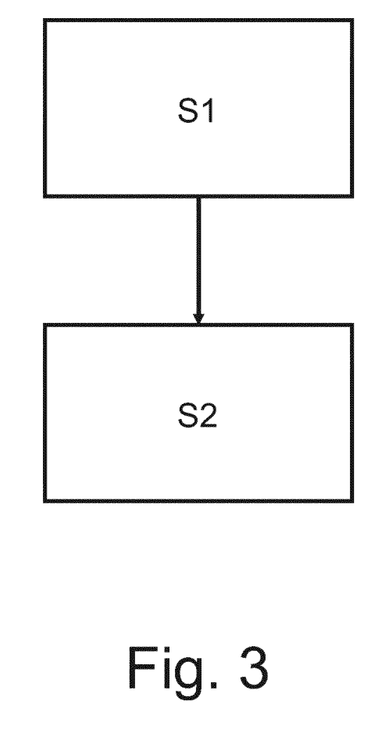
FIG. 3 illustrates a flow diagram with steps of a method for operating a traction drive system for a work machine according to an embodiment of the invention.

In FIG. 3, steps S1, S2 are shown for executing a method for operating the traction drive system 100 shown in FIG. 1 by means of the control device 110 shown in FIG. 2 in a time sequence. In a first step S1, determination takes place, on the basis of at least one operating parameter of the work machine 200, of a change to be expected in the motor output of the at least one electric motor 50, which change is conditional on the change of a gear ratio 30, 40 of the transmission device 10. In a subsequent second step S2, a gear ratio 30, 40 of the transmission device 10 is, as described with respect to FIG. 2, selected by the control device 110 depending on the change to be expected in the motor output.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 10 transmission device
11, 111 control interface
14, 24 transmission output
20 switch element
30, 40 gear ratios
50 electric motor
60 energy source
52, 62 motor speed
54, 56 drive speed
64, 66 drive speed
70 sensor
80 traction drive
82 chassis
90 work drive
92 work device
100 traction drive system
110 control device
120, 130, 140, 150, 160 sensor
200 work machine
210 switching identification
220, 222, 224, 226 measuring an operating parameter
230 determining a change in the motor output
240, 242, 244, 246, 248 optional measurement steps
250 comparison with threshold value
260 optionally taking into account further parameters
S1 determining a change in the motor output
S2 gear ratio selection

The invention claimed is:

1. A traction drive system for a work machine, comprising:
   at least one electric motor;
   a transmission; and
   a controller which is configured to select a gear ratio of the transmission depending on a change to be expected in a motor output of the at least one electric motor, each gear ratio providing mechanical connection of the transmission to both a traction drive and a work drive of the work machine,
   wherein the change to be expected in the motor output is conditional on a change in the gear ratio of the transmission,
   wherein the change to be expected in the motor output is determined on a basis of at least one operating parameter of the work machine, and
   wherein the change to be expected in the motor output is determined based on a simulation performed by the controller,
   wherein the at least one operating parameter is selected from a group consisting of a speed of the work machine, a change in the speed of the work machine, and a change in electrical energy which is output from an electrical energy source for supplying the at least one electric motor with energy,
   wherein the controller is configured to select at least two different gear ratios of the transmission, and
   wherein the controller is configured to select a second gear ratio which is different from a first gear ratio of the transmission when the change to be expected in the motor output is below a predetermined threshold value.

2. The traction drive system as claimed in claim 1, wherein the controller is configured to select the gear ratio of the transmission taking into account a total output of the traction drive system.

3. The traction drive system as claimed in claim 2, wherein the total output of the traction drive system is determined at least on a basis of one following operating parameters of the work machine:
a) a change in output during the change of the gear ratio,
b) a change in the output because of different degrees of efficiency of gear ratios of the transmission,
c) a change in the output because of incomplete transmission of force inside the traction drive system, and
d) an output characteristic of the traction drive system which is saved in a memory device of the work machine.

4. The traction drive system as claimed in claim 1, wherein the controller is configured to select the gear ratio of the transmission taking into account a temperature state in the traction drive system.

5. The traction drive system as claimed in claim 1, comprising at least one sensor for detecting a terrain structure surrounding the work machine, wherein the controller is configured to select the gear ratio of the transmission taking into account the terrain structure.

6. The traction drive system as claimed in claim 1, wherein the controller is configured to select the gear ratio of the transmission taking into account an operating state of a work device actively connected to the work drive of the work machine.

7. A work machine comprising the traction drive system as claimed in claim 1, wherein the traction drive system is configured to drive the work machine by a traction drive.

8. The traction drive system as claimed in claim 1, wherein a majority of the motor output is transmitted to the traction drive of the work machine in the first gear ratio of the at least two different gear ratios, and wherein the majority of the motor output is transmitted to the work drive of the work machine in the second gear ratio of the at least two different gear ratios.

9. A method for operating a traction drive system for a work machine which has at least one electric motor and a transmission, the method comprising:
determining, on a basis of at least one operating parameter of the work machine, a change to be expected in a motor output of the at least one electric motor, which the change to be expected in the motor output is conditional on a change in a gear ratio of the transmission, each gear ratio providing mechanical connection of the transmission to both a traction drive and a work drive of the work machine;
selecting the gear ratio of the transmission depending on the change to be expected in the motor output; and
setting the transmission to operate at the selected gear ratio,
wherein the change to be expected in the motor output is conditional on the change in the gear ratio of the transmission,
wherein the change to be expected in the motor output is determined on a basis of the at least one operating parameter of the work machine, and
wherein the change to be expected in the motor output is determined based on a simulation performed by the controller,
wherein the at least one operating parameter is selected from a group consisting of a speed of the work machine, a change in the speed of the work machine, and a change in electrical energy which is output from an electrical energy source for supplying the at least one electric motor with energy,
wherein the controller is configured to select at least two different gear ratios of the transmission, and
wherein the controller is configured to select a second gear ratio which is different from a first gear ratio of the transmission when the change to be expected in the motor output is below a predetermined threshold value.

10. A controller configured to be connected to a traction drive system by at least one interface and configured to perform the method as claimed in claim 9.

* * * * *